Patented May 30, 1950

2,509,859

UNITED STATES PATENT OFFICE 2,509,859

NITRILES FROM BUTADIENE AND HYDROGEN CYANIDE

Donald Drake Coffman and Leroy Frank Salisbury, Wilmington, Del., and Norman Dunshee Scott, Sanborn, N. Y., assignors to E. I. du Pont de Nemours & Company, Wilmington, Del., a corporation of Delaware No Drawing. Original application February 23, 1943, Serial No. 476,850. Divided and this application November 3, 1944, Serial No. 561,820

10 Claims. (Cl. 260—465.3)

This invention relates to the reaction of butadiene and hydrogen cyanide and to new compositions of matter particularly organic nitriles.

This application is a division of copending application Serial No. 476,850, filed February 23, 1943.

This invention has as an object the provision of a process for the preparation of nitriles. Another object is the preparation of 3-pentenenitrile. Other objects will appear hereinafter.

These objects are accomplished by the following invention wherein butadiene is reacted with hydrogen cyanide in the presence, as a catalyst, of a halide of a metal of group 1B of the periodic system.

The reaction of butadiene and hydrogen cyanide is conveniently carried out by placing butadiene, catalyst, and excess hydrogen cyanide in a pressure vessel. The vessel is then agitated at 20–50° C. for approximately twelve hours. Upon opening, the nitrile is removed by extraction with acetone, chloroform or ether. The solvent is evaporated to obtain the crude organic nitrile. Chloroform or ether solutions of these nitriles are washed with water to remove the catalyst and dried over anhydrous magnesium sulfate. The nitrile is obtained by evaporation of the solvent. In this case the nitrile is an easily distillable liquid and is purified further by distillation.

The more detailed practice of the invention is illustrated by the following example, wherein parts given are by weight. There are, of course, many forms of the invention other than this specific embodiment.

Example

This example illustrates the reaction of butadiene and hydrogen cyanide in the presence of anhydrous cuprous chloride as catalyst to obtain 3-pentenenitrile.

To a pressure vessel, cooled with a mixture of Dry Ice and acetone, were added 100 parts (3.7 moles) of hydrogen cyanide, 50 parts (0.925 mole) of butadiene, and 183 parts of anhydrous cuprous chloride (0.93 mole $Cu_2Cl_2$). The bomb was sealed and heated to 50° C. with agitation for a period of twelve hours. The maximum pressure obtained was 350 pounds per square inch and the total pressure drop was 50 pounds per square inch. The bomb was then vented to a series of cold traps from which were recovered six parts of unreacted butadiene and six parts of unreacted hydrogen cyanide. The bomb was then opened and the contents extracted with ether until fresh portions of the ether used for extraction were no longer colored brown. The ether was washed with dilute sodium hydroxide, then with water and was dried over anhydrous magnesium sulfate. Removal of the ether by evaporation followed by distillation of the residue gave 24 parts of an unsaturated mononitrile boiling at 144–146° C. This corresponded to a 27% conversion of butadiene and a 33% yield of 3-pentenenitrile. Redistillation of the crude 3-pentenenitrile gave 20 parts boiling at 141–142° C.

*Analysis.*—Found: C, 73.41; H, 9.08; N, 17.03; $n_D^{25}$, 1.200; $d_4^{25}$, 0.9678; MR, 26.15. Calcd. for $C_5H_7N$: C, 74.1; H, 8.66; N, 17.29; MR, 26.98.

The 3-pentenenitrile (10 parts) was hydrolyzed to gamma-valerolactone by heating under reflux with excess concentrated hydrochloric acid. The lactone was extracted from the aqueous hydrochloric acid solution by means of ether and the ether extracts dried over anhydrous magnesium sulfate. The ether was removed by distillation. Distillation of the residue gave 7½ parts of gamma-valerolactone.

*Analysis.*—Found: Saponification equivalent, 101.6; calcd. for $C_5H_8O_2$: Saponification equivalent, 100.

The lactone reacted with hydrazine hydrate to form the known hydrazide melting at 58–61° C. In contrast with the yields obtained in the above reaction using approximately one mole cuprous chloride ($Cu_2Cl_2$) per mole of butadiene, the reaction using one hundred parts hydrogen cyanide, fifty parts butadiene and one part, i. e., 0.006 mole per mole of butadiene, of cuprous chloride at 50° C. for 12 hours under superatmospheric pressure with constant agitation gave a 5.5% conversion and a 3% yield of 3-pentenenitrile.

The reaction of butadiene with hydrogen cyanide in the presence of group 1B metal halide catalysts, e. g., cuprous chloride, silver iodide, cuprous iodide, gold chloride, leads to the formation of a mononitrile. Thus, 3-pentenenitrile is formed in yields as high as 67% by the reaction of butadiene and hydrogen cyanide in the presence of cuprous chloride. It is preferred to employ amounts of catalyst as great as one mole for each mole of butadiene present since optimum yields are obtained under these conditions. Smaller amounts of catalyst may be used, in which case lower yields are usually obtained, or greater amounts than one mole may be used.

The proportions of butadiene and hydrogen cyanide which can be used in this reaction vary widely and an excess of butadiene or hydrogen cyanide may be used. In those cases where an excess of butadiene is employed, it is desirable not to use an amount greater than a two to one mole ratio of butadiene to hydrogen cyanide. However, it is preferred to carry out the reaction in the presence of an excess of hydrogen cyanide, e. g., where the mole ratio of butadiene to hydrogen cyanide varies from 1:1 to 1:4.

Butadiene may be reacted with hydrogen cyanide over a wide range of temperatures but, for ease of operation, it is preferred to carry out the reaction at temperatures between $-14°$ C. and $184°$ C. The time required for the reaction is not critical, twelve hours being sufficient in most cases. It is preferred to prevent ingress of moisture, since water tends to hydrolyze hydrogen cyanide to formic acid and ammonia.

The types of apparatus that may be used in the practice of this invention are numerous and varied but do not constitute a part of the invention. Butadiene and hydrogen cyanide are low boiling liquids and it is advantageous to carry out the reaction under superatmospheric pressures. These pressures may vary from 1 to 50 atmospheres (i. e., atmospheric pressure to the critical pressure of hydrogen cyanide). The preferred pressure range is 1 to 25 atmospheres. The pressure of the reaction mixture is in the latter range when temperatures of up to $100°$ C. are employed. The apparatus used should be capable of withstanding superatmospheric pressures and should be so designed to allow accurate temperature control. Further it should be so designed to prevent ingress of moisture and should have facilities for charging and venting without danger of hydrogen cyanide vapors being discharged to the peril of the operator.

The reaction product of butadiene and hydrogen cyanide in the presence of group 1B metal halide catalysts, i. e., 3-pentenenitrile, can be hydrolyzed to gamma-valerolactone, a source of 4-hydroxypentanoic acid.

The above description and examples are intended to be illustrative only. Any modification of or variation therefrom which conforms to the spirit of the invention is intended to be included within the scope of the claims.

What is claimed is:

1. Process which comprises bringing butadiene in contact with hydrogen cyanide in the presence of a cuprous halide catalyst and isolating the butadiene-hydrogen cyanide addition product.

2. Process which comprises reacting butadiene with hydrogen cyanide in the presence of cuprous chloride and isolating the butadiene-hydrogen cyanide adduct.

3. Process which comprises heating butadiene in an anhydrous closed system with hydrogen cyanide and approximately one mole, per mole of hydrogen cyanide, of anhydrous cuprous chloride for 12 hours at $50°$ C. and isolating the butadiene-hydrogen cyanide adduct.

4. Process which comprises bringing one mole of butadiene in contact at 1–25 atmospheres pressure and $-14$ to $100°$ C. under anhydrous conditions with one to four moles of hydrogen cyanide and one mole of cuprous chloride as a catalyst and isolating the butadiene-hydrogen cyanide adduct.

5. Process which comprises bringing one mole of butadiene in contact under anhydrous conditions at 1–50 atmospheres pressure and at $-14$ to $100°$ C. with one to four moles of hydrogen cyanide and one mole of cuprous chloride as catalyst and isolating the butadiene-hydrogen cyanide adduct.

6. Process which comprises bringing one mole of butadiene in contact under anhydrous conditions at 1–50 atmospheres pressure and at $-14$ to $100°$ C. with one to four moles of hydrogen cyanide and one mole of a cuprous halide as a catalyst and isolating the butadiene-hydrogen cyanide adduct.

7. Process which comprises reacting butadiene with hydrogen cyanide at superatmospheric pressure and temperature under anhydrous conditions in the presence of a cuprous halide catalyst and isolating the butadiene-hydrogen cyanide adduct.

8. The process which comprises contacting butadiene and hydrogen cyanide with anhydrous cuprous chloride catalyst under anhydrous conditions at elevated temperature and pressure conditions such that liquid phase reaction conditions are maintained, and isolating the butadiene-hydrogen cyanide adduct.

9. The process which comprises contacting butadiene and hydrogen cyanide with a cuprous chloride catalyst under anhydrous conditions at elevated temperature and pressure and isolating the butadiene-hydrogen cyanide adduct.

10. The process which comprises contacting butadiene and hydrogen cyanide with a cuprous halide catalyst under anhydrous conditions at elevated temperature and pressure and isolating the butadiene-hydrogen cyanide adduct.

DONALD DRAKE COFFMAN.
LEROY FRANK SALISBURY.
NORMAN DUNSHEE SCOTT.

REFERENCES CITED

The following references are of record in the file of this patent:

UNITED STATES PATENTS

| Number | Name | Date |
|---|---|---|
| 2,102,611 | Carothers et al. | Dec. 21, 1937 |
| 2,123,504 | Dykstra | July 12, 1938 |
| 2,322,696 | Kurtz et al. | June 22, 1943 |
| 2,385,741 | Teter | Sept. 25, 1945 |
| 2,422,859 | Schulze et al. | June 24, 1947 |

OTHER REFERENCES

Kharasch et al., J. Org. Chem., vol. 2, pp. 489–496 (1937).

Certificate of Correction

Patent No. 2,509,859                                  May 30, 1950

DONALD DRAKE COFFMAN ET AL.

It is hereby certified that error appears in the printed specification of the above numbered patent requiring correction as follows:

Column 2, line 12, for that portion of the analysis reading "1.200" read *1.4200*; and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*